United States Patent
Waku et al.

(10) Patent No.: US 8,364,212 B2
(45) Date of Patent: *Jan. 29, 2013

(54) PORTABLE WIRELESS DEVICE

(75) Inventors: Kenji Waku, Kanagawa (JP); Kunihiko Watanabe, Kanagawa (JP); Yasuhiro Abe, Kanagawa (JP); Tei Riku, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 587 days.

This patent is subject to a terminal disclaimer.

(21) Appl. No.: 12/513,144

(22) PCT Filed: Oct. 29, 2007

(86) PCT No.: PCT/JP2007/071067
§ 371 (c)(1),
(2), (4) Date: Dec. 17, 2009

(87) PCT Pub. No.: WO2008/053859
PCT Pub. Date: May 8, 2008

(65) Prior Publication Data
US 2010/0093411 A1    Apr. 15, 2010

(30) Foreign Application Priority Data

Oct. 30, 2006  (JP) .................................. 2006-294691
Oct. 30, 2006  (JP) .................................. 2006-294692

(51) Int. Cl.
H04M 1/00    (2006.01)
(52) U.S. Cl. ..................................... 455/575.1; 455/347
(58) Field of Classification Search .......... 455/347–349, 455/550.1, 575.1–575.8, 90.3; 361/616, 361/667, 724–727, 747, 769; 429/97, 100; 439/500; 403/166, 331
See application file for complete search history.

(56) References Cited

U.S. PATENT DOCUMENTS

| 7,268,731 B2* | 9/2007 | Chiang et al. ................. 343/702 |
| 7,991,147 B2* | 8/2011 | Emmert .................... 379/433.01 |
| 2002/0022459 A1* | 2/2002 | Kobayashi ...................... 455/90 |
| 2009/0115668 A1* | 5/2009 | Abe .............................. 343/702 |

FOREIGN PATENT DOCUMENTS

| JP | 09-069798 | 3/1997 |
| JP | 11-274843 | 10/1999 |

(Continued)

OTHER PUBLICATIONS

Japanese language office action dated May 8, 2012 and its English language translation issued in corresponding Japanese application 2006294691.
Japanese language office action dated May 8, 2012 and its English language translation issued in corresponding Japanese application 2006294692.

Primary Examiner — Dominic E Rego
(74) Attorney, Agent, or Firm — DLA Piper (US) LLP

(57) ABSTRACT

The present invention has an object of attaining further miniaturization and reducing the thickness of a portable wireless device with a built-in antenna. The cellular telephone device 1 according to the one embodiment of the present invention includes a case body 60 having a first case portion 62 which is arranged so as to cover the electronic components, along with being electrically conductive to the reference potential pattern, and a nonconductive second case portion 64 arranged to be continuous to the first case portion 62 along with being arranged in the outer periphery of the circuit substrate 70. In the portion that is arranged to be layered in the second case portion 64 in a flexible wiring substrate 50, an antenna element 66 is arranged.

12 Claims, 10 Drawing Sheets

FOREIGN PATENT DOCUMENTS

| | | |
|---|---|---|
| JP | 2000-134020 | 5/2000 |
| JP | 2000-134021 | 5/2000 |
| JP | 2006-067524 | 3/2006 |
| JP | 2006-238204 | 9/2006 |

* cited by examiner

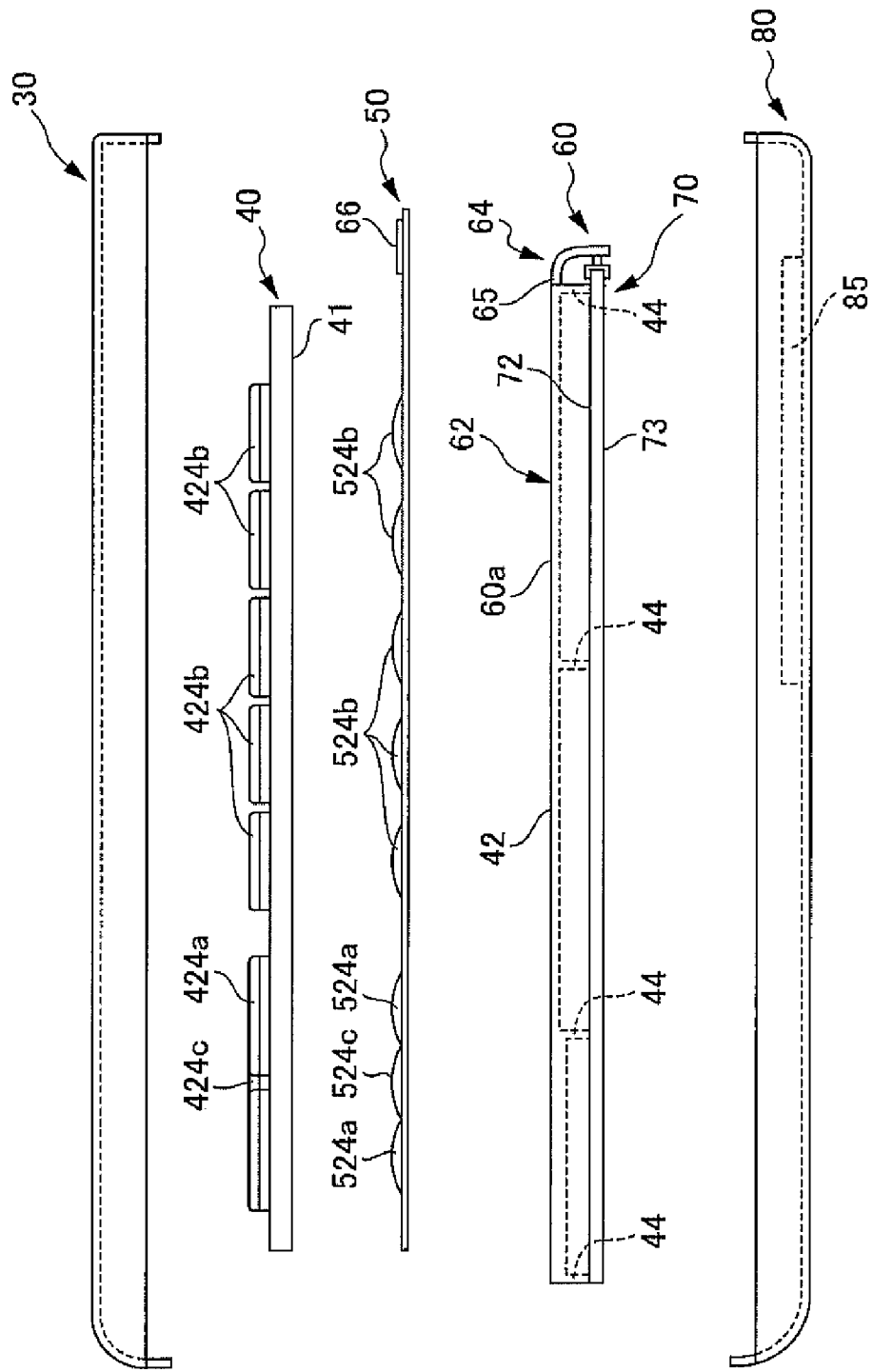

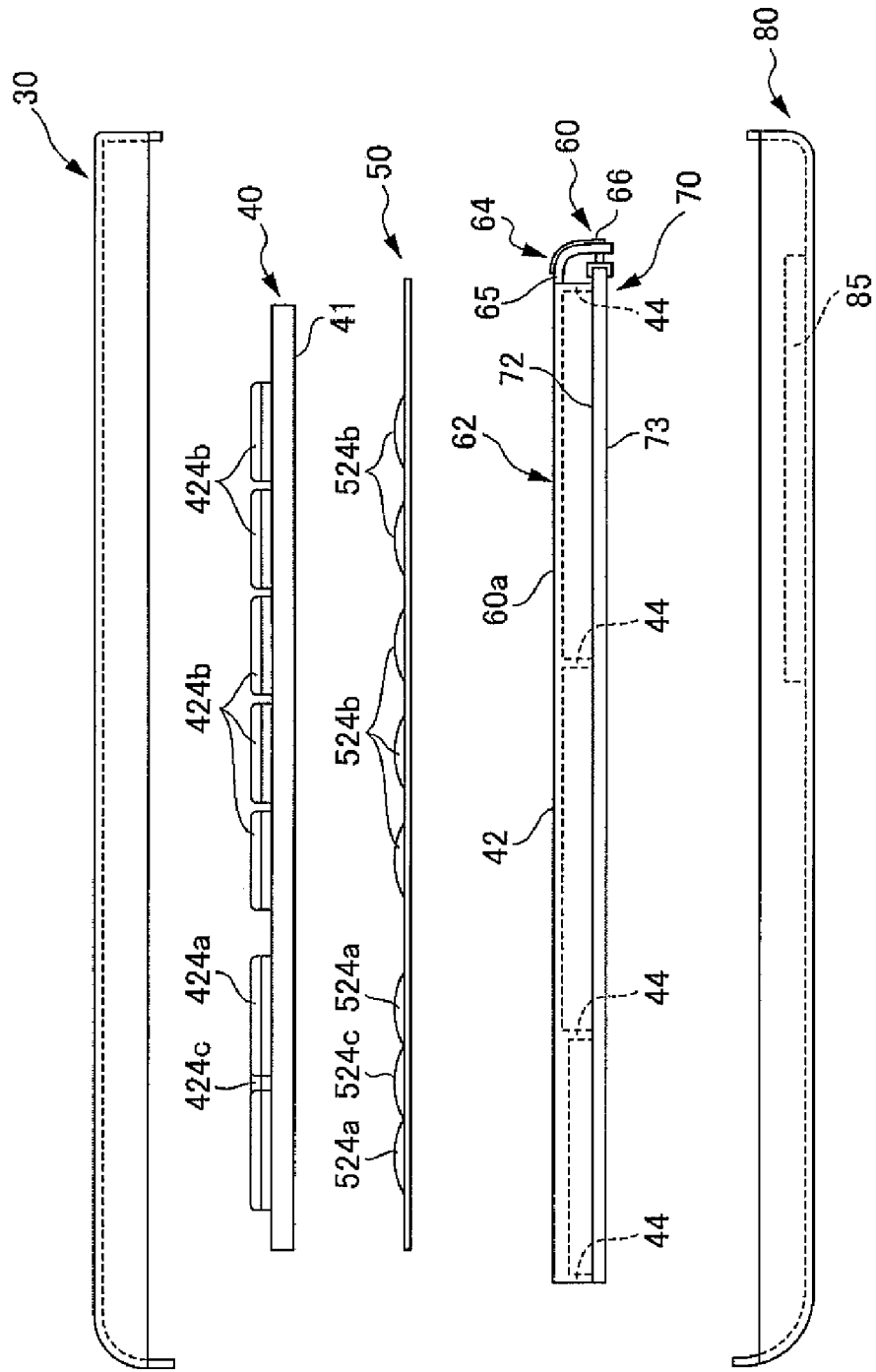

PORTABLE WIRELESS DEVICE

CROSS-REFERENCE TO THE RELATED APPLICATIONS

This application is a national stage of international application No. PCT/JP2007/071067 filed Oct. 29, 2007, which also claims the benefit of priority under 35 USC 119 to Japanese Patent Application No. 2006-294691 filed Oct. 30, 2006 and Japanese Patent Application No. 2006-294692 filed Oct. 30, 2006, the entire contents of which are incorporated herein by reference.

TECHNICAL FIELD

The present invention relates to a portable wireless device equipped with an antenna such as a cellular telephone device having a built-in antenna, a PHS (Personal Handy phone System), a PDA (Persona Digital Assistant), a portable navigation device, and a notebook-size personal computer.

BACKGROUND ART

Conventionally, in a cellular telephone device as a portable wireless device, a structure to mount an antenna outside of a housing has been adopted. However, in recent years, in consideration of design, etc., a structure building an antenna into a housing has gradually become adopted.

Moreover, in the case that a wireless communication terminal of a cellular telephone device, etc. supports EV-DO, which is a kind of CDMA 2000 as a communication system and a dual band+GPS (Global Positioning System), and Bluetooth, which is a kind of short distance wireless communication system, it is necessary to provide more than two antennae. Even in such cases, it is preferable to adopt a structure which builds the antennae into a housing.

As described above, in a portable wireless device such as a cellular telephone device, it is becoming common for an antenna to be built into a housing. As such a portable wireless device with a built-in antenna, for example, a cellular telephone device can be cited, in the housing of which a battery, a circuit board, a shielded case, a flexible wiring substrate, and a key sheet are sequentially arranged to be layered, and at the same time, an antenna is arranged in the end of the housing (Japanese Unexamined Patent Application, First Publication No. 2006-67524).

DISCLOSURE OF THE INVENTION

Problems to be Solved by the Invention

Meanwhile, in recent years, for portable wireless devices such as cellular telephone devices, further miniaturization and reducing the thickness have been required, but conventional configurations have not been sufficient for the requirement.

One object of the present invention is to attain further miniaturization and reducing the thickness in portable wireless devices of which an antenna is built in.

Means for Solving the Problems

The present invention relates to a portable wireless device which includes: a circuit substrate having a reference potential pattern and electronic components in a first face; a case body having a first case portion, which is arranged so as to cover the electronic components and is electrically conductive to the reference potential pattern, and a nonconductive second case portion that is arranged to be continuous to the first case portion and is arranged in an outer periphery of the circuit substrate; and a housing that houses the circuit substrate, and the case body, in which an antenna is arranged in a second case portion or in a predetermined member arranged to be layered in the second portion.

The present invention relates to a portable wireless device which includes: a circuit substrate having a reference potential pattern and electronic components in a first face; a case body having a first case portion which is arranged so as to cover the electronic components and is electrically conductive to the reference potential pattern, and a nonconductive second case portion that is arranged to be continuous to the first case portion and is arranged in an outer periphery of the circuit substrate; a wiring substrate that is arranged to be layered in a side opposite to the circuit substrate side in the case body from the first case body to the second case portion; and a housing that houses the circuit substrate, the case body, and the wiring board, in which an antenna element is arranged in the portion arranged to be layered in the second case portion in the wiring substrate.

A wall portion in which an antenna element of a wiring substrate in the second case portion is arranged to be layered is preferably disposed so that a virtual plane including the wall portion intersects with a virtual plane in parallel to the circuit substrate.

In addition, a plurality of key switches is included in a portion arranged to be layered in at least the first case portion in the wiring substrate, and a key sheet is preferably provided between the housing and the key switches.

Moreover, the plurality of key switches is preferably arranged from the first case portion to the second case portion.

Furthermore, a feed point capable of supplying electric power to the antenna element is disposed in a rear surface of an opposite side to a face in which the electronic components are arranged on the circuit substrate, in which a connection portion, which can be connected to the feed point and electrically conductive to the antenna element, is arranged in one end side of the face on the case body side of the wiring substrate, and in which the portion including the connection portion in the wiring substrate is provided to be extended in the rear side of the circuit substrate so as to be folded back, and the connection portion and the feed point are preferably connected.

In addition, the first case portion and the second case portion are configured to be separate members, and are preferably integrated to be mutually engaged.

Furthermore, the case body includes the first case portion and the second case portion, which are integrally molded with resin, and a portion configuring the first case portion is preferably covered with a conductive film.

The present invention relates to a portable wireless device which includes: a circuit substrate having a reference potential pattern and electronic components in a first face; a case body having a first case portion, which is arranged so as to cover the electronic components and is electrically conductive to the reference potential pattern, and a nonconductive second case portion, which is arranged to be continuous to the first case portion and is arranged in an outer periphery of the circuit substrate; and a housing that houses the circuit substrate and the case body, in which the second case portion is provided with a wall portion in which an antenna element is arranged, the wall portion being arranged so that a virtual plane including the wall portion intersects with a virtual plane in parallel to the circuit substrate.

In addition, a key board that includes key switches is further provided, where the key board is preferably arranged to be layered in an opposite side to the circuit substrate side in the first case portion of the case body.

Furthermore, key switches are provided in the second face side, which is an opposite side to the first face of the circuit substrate, in which the case body is disposed so as to cover a portion of the first face, and a battery is preferably arranged between a portion where the case body is not arranged in the first face and an outer lateral side in the housing.

In addition, the first case portion and the second case portion are configured as separate members, and preferably are mutually engaged to be integrated.

Moreover, in the case body, the case body includes the first case portion and the second case portion, which are integrally molded with resin, and a portion configuring the first case portion is preferably covered with a conductive film.

Effects of the Invention

According to the present invention, it is possible to enhance the freedom of design in portable wireless devices and to attain miniaturization and a reduction in thickness.

BRIEF DESCRIPTION OF THE DRAWINGS

FIG. 3 is an exploded side view of the operation unit housing 21 according to the first embodiment;

FIG. 9 is an exploded side view of the operation unit housing 21 according to a second embodiment;

PREFERRED MODE FOR CARRYING OUT THE INVENTION

A description is provided hereinafter regarding an embodiment of the present invention. It should be noted that, although a description is provided regarding a cellular telephone device as a portable wireless device, the present invention is not limited thereto, and it may be other portable wireless devices equipped with an antenna such as a PHS (Personal Handy phone System), a PDA (Persona Digital Assistant), a portable navigation device, and a notebook-sized personal computer.

Figure 1:
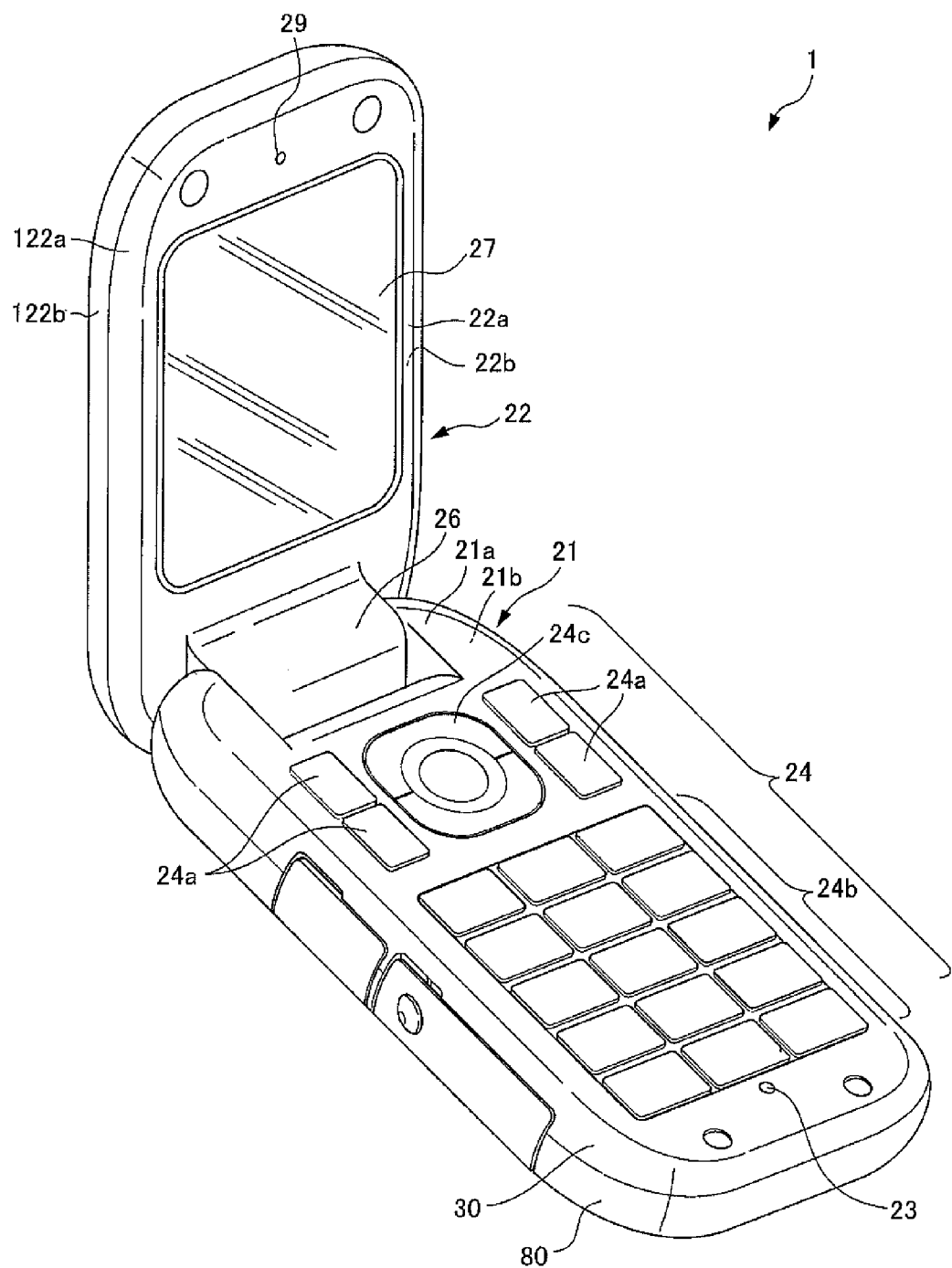
FIG. 1 is an exterior perspective view of a cellular telephone device 1 according to a first embodiment.

According to FIGS. 1 to 8, a cellular telephone device 1 according to the first embodiment is described. First, the basic structure of the cellular telephone device 1 is described. FIG. 1 is an exterior perspective view of a cellular telephone device 1 according to a first embodiment; As shown in FIG. 1, the cellular telephone device 1 is a folding type cellular telephone device 1 which includes a rectangular thin operation unit housing 21 and a rectangular thin display unit housing 22.

The upper end portion of the operation unit housing 21 and the lower end portion of the display unit housing 22 are connected to be openable and closable through a hinge mechanism 26. The cellular telephone device 1 can be made to be in an opened state in which the operation unit housing 21 and the display unit housing 22 are mutually opened, and to be in a folded state in which the operation unit housing 21 and the display unit housing 22 are folded, by relatively rotating (turning) the connected operation unit housing 21 and display unit housing 22 through a hinge mechanism 26. It should be noted that, in the present embodiment, the folding type cellular telephone device 1 is described as the portable wireless device; however, it is not being the folding type, it may be a slider type in which one housing can be slid in one direction from the state of both bodies 21 and 22 being superimposed, and may be a rotating type in which one housing is made to rotate around an axis line along the superimposed direction, and further, it may be one in which both bodies 21 and 22 are connected through a two-axial hinge; furthermore, it may be one in which the later described display unit 27 and the operation unit 24 are arranged in one housing.

As shown in FIG. 1, a display unit housing 22 includes a display unit 27 being arranged in the inner lateral side 22a, which is a side facing to the operation unit housing 22 in the folded state and that displays various kinds of information, and a sound output unit 29, which outputs the sound of the other party of the conversation.

The display unit housing 22 houses a circuit substrate, not shown in the drawing, in the interior of a front case 122a and a rear case 122b. In the surface of this circuit substrate, a liquid crystal module constituting the display unit 27 is arranged. The liquid crystal module is housed so that a display surface thereof is exposed from the front case 122a. In addition, in the circuit substrate, various kinds of electronic components are mounted and electrically connected.

As shown in FIG. 1, the operation unit housing 21 includes an operation unit 24 arranged in the inner lateral side 21a, which is a side facing to the display unit housing in a folded state, a sound input unit 23 to which the sound generated by the user of cellular telephone device 1 is input, and a battery, not shown in FIG. 1, being arranged in the outer lateral side 21b, which is the opposite side to the inner lateral side 21a. The operation unit 24 includes function setting operation buttons 24a for operating various functions such as various settings and a telephone book function, and a mail function, input operation buttons 24b for inputting the digits of a telephone number, and the characters of mail, etc., and a select button 24c to perform selection of the various operations, scrolling, etc.

Figure 2:
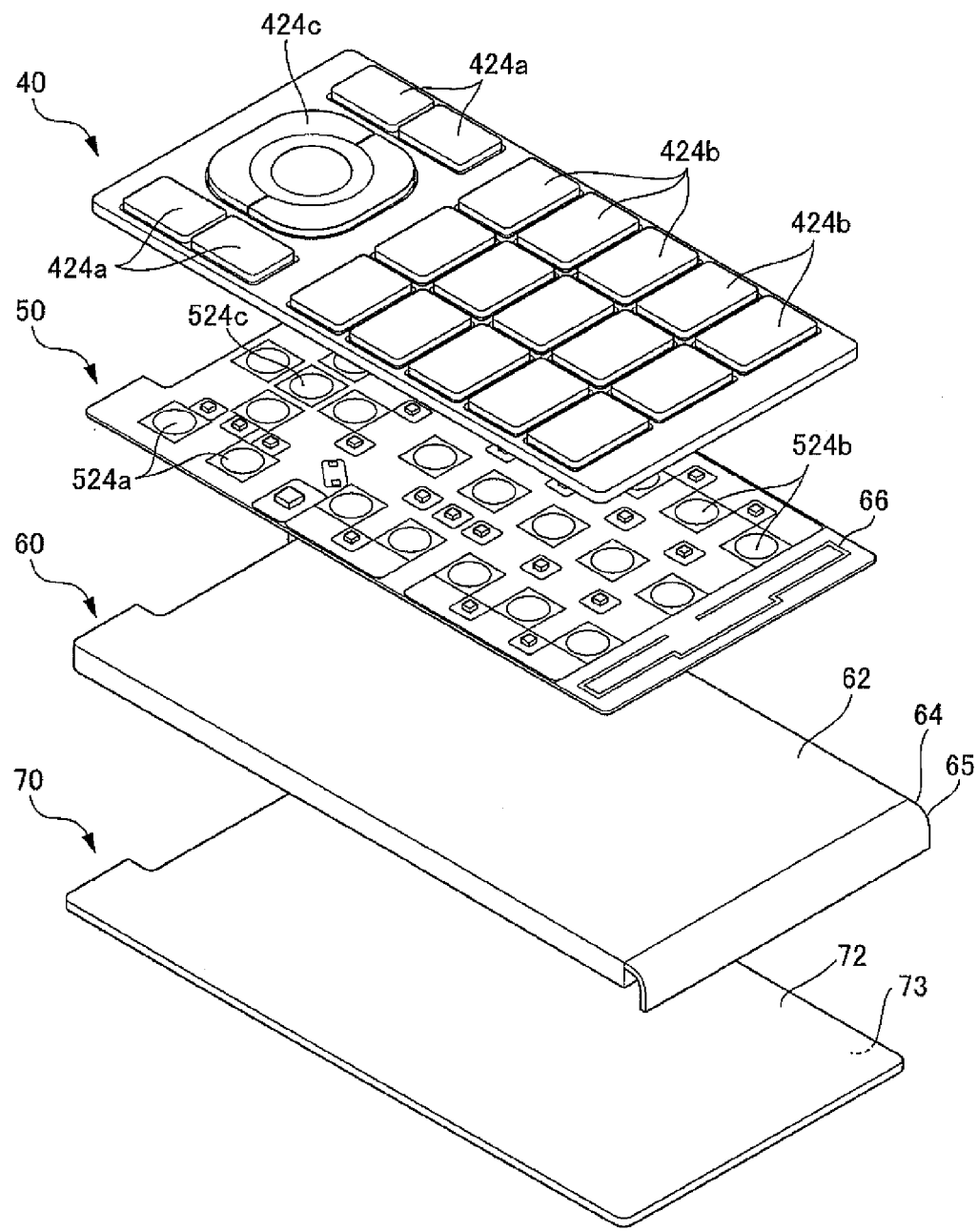
FIG. 2 is an exploded perspective view of a member built in an operation unit housing 21 according to the first embodiment.
Figure 4A:
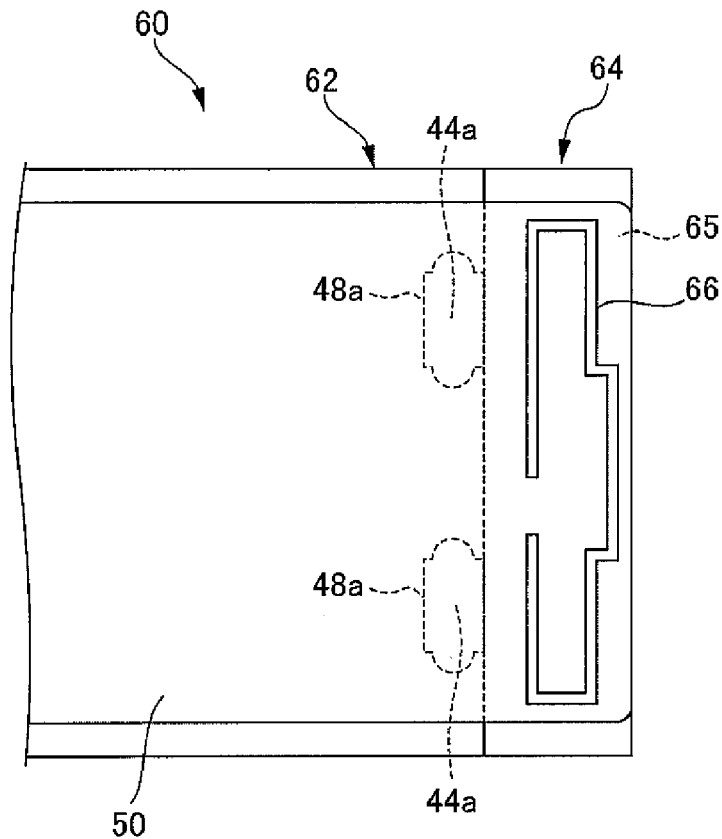
FIG. 4A is a partial plan view illustrating the structure of a case body 60 and a flexible wiring substrate 50 according to the first embodiment.
Figure 4B:
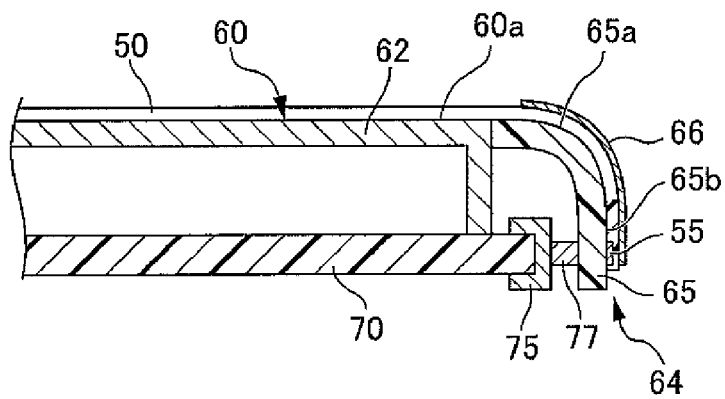
FIG. 4B is a partial cross-sectional view illustrating the structure of the case body 60 and the flexible wiring substrate 50 according to the first embodiment.

FIG. 2 is an exploded perspective view of the member built in an operation unit housing 21 according to the first embodiment FIG. 3 is an exploded perspective view of the operation unit housing 21 according to the first embodiment. FIG. 4A is a partial plan view illustrating the structure of a case body 60 and a flexible wiring substrate 50 in the first embodiment, and FIG. 4B is a partial cross-sectional view illustrating the structure of the case body 60 and the flexible wiring substrate 50 in the first embodiment. Here, FIG. 3 is an exploded side view including a state in which a flexible wiring substrate 50 is arranged to be layered in a case body 60 in order to illustrate the relation between the case body 60 and the flexible wiring substrate 50.

As shown in FIG. 2 or FIG. 3, the operation unit housing 21 includes a front case 30, a key sheet 40 constituting the above described various kinds of buttons 24a, 24b, and 24c, a flexible wiring substrate 50, a case body 60, a circuit substrate 70 equipped with various kinds of electronic components including a reference potential pattern and an RF module for a cellular telephone device, a rear case 80, and a battery 85. In the operation unit housing 21, the front case 30, the key sheet 40, the flexible wiring substrate 50, the case body 60, the circuit substrate 70, and the rear case 80 are arranged to be layered. The battery 85 is housed detachably from outside in an opening, not shown in drawing formed, in the rear case 80.

As shown in FIG. 2 or FIG. 3, the front case 30 and the rear case 80 are arranged so that the inner lateral sides of recessed shape face mutually, and are connected so that the mutual outer peripheries are superimposed. Between the front case 30 and the rear case 80, the key sheet 40 and the flexible wiring substrate 50, the case body 60, and the circuit substrate 70 are built in so as to be sandwiched. In other words, the case body 60 is arranged to be layered so as to cover a first face 72 of the circuit substrate 70, the flexible wiring substrate 50 is arranged to be layered in the upper face side of the case body 60, and the key sheet 40 is arranged to be layered in the upper face of the flexible wiring substrate 50.

In the circuit substrate 70, various kinds of electronic components, not shown in the drawing, are arranged in the first face 72 of the front case 30 side and in the second face 73, which is the opposite side to the first face 72. Moreover, in the first face 72 in the circuit substrate 70, the reference potential pattern, not shown in drawing, is formed.

The case body 60 is equipped with a conductive first case portion 62, and a nonconductive second case portion 64. The first case portion 62 is arranged to face the first plane 72 in the circuit substrate 70 so as to cover the various electronic components, not shown in drawing, arranged in the first face 72 in the circuit substrate 70, as well as being electrically conductive (electrically connected) to the reference potential pattern. The second case portion 64 is arranged continuously with the one end of the first case portion 62, while being arranged in the outer periphery of the circuit substrate 70.

As shown in FIGS. 4A and 4B, the first case portion 62 and the second case portion 64 are separate members, and are mutually engaged to be integrated. More specifically, a protruded engaging portion 44a formed in the one end of the second case portion 64 engages with the recessed engaged portion 48a formed in the one end of the first case portion 62 so as to be integrally combined and fixed. The case body 60 consisting of the first case portion 62 and the second case portion 64 in a state mutually engaged is configured so that the surface of the opposite side to the circuit substrate 70 forms one continuous smooth face 60a.

The first case portion 62 is a member made of metal having a shape in which one broad plane of a thin rectangular housing is opened. More specifically, as shown in FIG. 3, the first case portion 62 has a flat plate portion 42, and a rib 44 formed about vertically in the one face of the side facing the circuit substrate 70 in the flat plate portion 42. The rib 44 is formed in a predetermined position of the perimeter and the inside of the flat plate portion 42. Moreover, the rib 44 is formed so as to be equivalent or sufficiently higher than the height of electronic component of the largest height among various kinds of electronic components mounted in the first face 72 in the circuit substrate 70. It should be noted that, other than being formed of metal, the first case portion 62 may be have a framework formed of resin, and a conductive film formed on the surface thereof. This conductive film may be constituted by applying a metallic component to the surface of the first case member 62 with metal vapor deposition or metallic coating, for example, or the metallic component may be printed on the same surface.

The first case portion 62 is provided and arranged to oppose the circuit substrate 70 in an electrically conductive state to the reference potential pattern by the front end of the rib 44 being in contact with the reference potential pattern formed in the first plane 72 in the circuit substrate 70. In this way, the first case portion 62 is made to have a potential of the same magnitude by being electrically conductive to the reference potential pattern. In other words, the first case portion 62 functions as a shield case. Consequently, the first case portion 62 prevents, as a shield case, noise from outside from acting on various kinds of electronic components, not shown in drawing, arranged in the first plane 72 of the circuit substrate 70, as well as preventing noise radiated from RF (radio frequency) circuit from acting on the other electronic components arranged in the first face 72 by absorbing the noise.

The first case portion 62 is formed so that the one end side (right end side in FIG. 3) is shorter than the circuit substrate 70 in a state being mounted on the upper face of the circuit substrate 70. Then, the second case portion 64 is arranged in the portion where the first case portion 62 in the circuit substrate 70 is not arranged.

The second case portion 64 is, as shown in FIGS. 4A and 4B, is a resinous member having a wall portion 65 constituted by a curved surface 65a continuing to the upper face side of the first case portion 62 and a flat surface 65b formed continuously to the curved surface 65a, with the flat surface 65b being perpendicular to the upper face of the first case portion 62. By integrally engaging the second case portion 64 with the first case portion 62, the flat plate portion 42 and the wall portion 65 form one continuous surface 60a. In this continuous surface, the later described flexible wiring substrate 50 is arranged to be layered.

The flexible wiring substrate 50 has a plurality of key switches 524a, 524b, and 524c in the face of the front case 30 side, and is mounted on the flat plate portion 42 of the first case 62 in the case body 60 and on the wall portion 65 of the second case portion 64. Since the flexible wiring substrate 50 is freely transformable, in a state mounted on the case body 60, it can be extended out ranging from the first case portion 62 to the second case portion 64.

The key switches 524a, 524b, and 524c of the flexible wiring substrate 50 is made to be a structure having a metal dome of a metal plate formed cubically to curve like a bowl. When the bowl-like shaped top is depressed, the metal dome contacts a switch terminal formed in a circuit, not shown in the drawing, printed in the surface of the flexible wiring substrate 50, and is electrically conductive.

In the portion arranged to be layered in the second case portion 64 in the flexible wiring board 50, an antenna element 66 is arranged. Since the second case 64 is arranged in one end side of the cellular telephone device 1, the antenna element 66 is arranged in the one end side of the cellular telephone device 1. More specifically, it is arranged in the end portion side opposite to the hinge mechanism 26 side.

The antenna element 66 is a belt-like metal film, and is arranged so as to be along a face of the opposite side to the second case portion 64 side of the flexible wiring substrate 50. In other words, the antenna element 66 is arranged so as to be along the face where the key switches 524a, 524b, and 524c in the flexible wiring substrate 50 are arranged. More specifically, as shown in FIG. 4A, the belt-like metal film of the antenna element 66 goes around the outer periphery of the outer wall 65 so as to connect the mutually separated two points positioned at the first case portion 62 side in the wall portion 65 of the second case portion 64, as well as being arranged so as to have a protruded portion protruding outward in the side apart from the first case portion 62.

It should be noted that, although the flexible wiring substrate 50 has a configuration in which wiring is sandwiched between a plurality of insulating films, in a case where the antenna element 66 is formed in the opposite side to the second case portion side, the wiring is made so as not to be provided between the insulating films constituting the flexible wiring substrate 50 of the region facing to the second case portion 64.

Furthermore, the antenna element 66 may be formed along the face of the second case portion 64 side of the flexible wiring substrate 50 other than to be formed in the face of the opposite side to the second case 64 side of the flexible wiring substrate 50. In this case as well, the wiring is made so as not to be provided between the insulating films constituting the flexible wiring substrate 50 in the region facing the second case portion 64. Further, in place of the antenna element 66 formed in the surface of the flexible substrate 50, the wiring in the flexible substrate 50 in the region facing the second case portion 64 can be used as the antenna element 66.

The portion where the antenna element 66 in the flexible wiring substrate 50 is arranged to be layered is disposed to range from the curbed surface 65a to the vertical flat surface 65b in the wall portion 65 of the second case portion 64. The curved surface 65a and the flat surface 65b in the wall portion 65 of the second case portion 64 is a face (a face which is not parallel) intersecting with the broad face in the case body 60 and the circuit substrate 70, and the antenna element 66 is arranged in the positional relationship so as to intersect with the broad face in the case body 60 and the circuit substrate 70. More specifically, the wall portion 65 (the curved surface 65a and the flat surface 65b) in which the antenna element 66 of the flexible wiring substrate 50 in the second case portion 64 is arranged to be layered is disposed so that a virtual plane including the wall portion 65 intersects with the virtual plane in parallel to the circuit substrate 70. In addition, in the present embodiment, the virtual plane including the wall portion 65 in which the antenna element 66 of the flexible wiring substrate 50 in the second case portion 64 is arranged to be layered is referred to as the virtual plane including an arbitrarily specified positional region among the face of the wall portion 65 in which the antenna element 66 of the flexible wiring substrate 50 is arranged to be layered.

In a state in which the flexible wiring substrate 50 is mounted on the case body 60, the antenna element 66 is fed by the circuit substrate 70 through a feed terminal 77. The feed terminal 77 is inserted through a hole, not shown in drawing, formed in the vertical flat surface 65b of the wall portion 65 in the second case body 64, one end of which is connected to a contact point 55 formed in the rear side of the opposite side to the face in which the antenna element 66 in the flexible wiring substrate 50 is arranged. The contact point 55 is electrically conductive to the antenna element 66. The other end of the feed terminal 77 is arranged in the end face of the circuit substrate 70, along with being connected to a conductive portion 75 connected to the feed portion, not shown in the drawing. In this way, the antenna element 66 is fed from the circuit substrate 70 through the feed terminal 77, while being connected to a radio frequency circuit such as an RF module of the circuit substrate 70.

The key sheet 40 is constituted so that a plurality of key tops 424a, 424b, and 424c is stuck to the surface of a sheet 41 made of silicon with adhesive. The plurality of key tops 424a, 424b, and 424c of the key sheet 40 is arranged at positions facing the key switches 524a, 524b, and 524 c, while being arranged so as to be exposed from key holes, not shown in drawing, formed in a later described front case 30.

In the front case 30, a plurality of key holes are formed in the inner lateral side 21a facing the display unit 27 in the display unit housing 22 while the cellular telephone device 1 is folded back. From each of the plurality of key holes, each depressing surface of the key tops 424a, 424b, and 424c stuck to the key sheet 40 is exposed. By depressing each depressing surface of the exposed key tops 424a, 424b, and 424c, the top of the metal dome (bowl like shape) in each corresponding switch 524a, 524b, and 524c is depressed to contact the switch terminal, and is electrically conducted.

According to the present embodiment, while the antenna element 66 is formed in the flexible wiring substrate 50, the flexible wiring substrate 50 is mounted on the case body 60. More specifically, the portion where the antenna element 66 in the flexible wiring substrate 50 is disposed is arranged to be layered in the second case portion 64. In this way, compared to a conventional structure in which the antenna base is arranged in parallel to the circuit substrate, the cellular telephone device 1 can be miniaturized and reduced in thickness. For example, by arranging other components in the portion that had been occupied by the conventional antenna base, the cellular telephone device 1 can be miniaturized and reduced in thickness.

Figure 7:
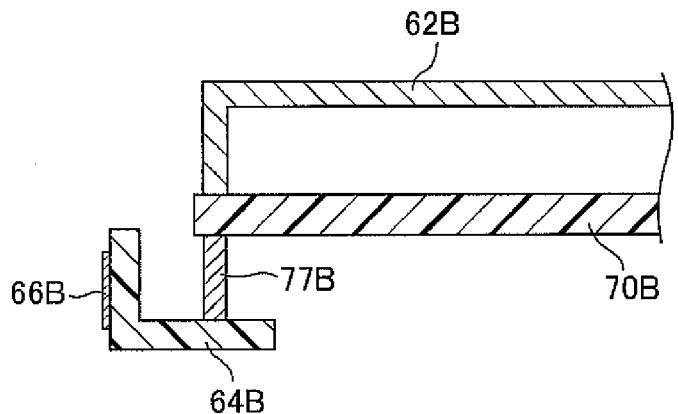
FIG. 7 is a partial side view of a conventional electrical power feed structure.

Moreover, as shown in FIG. 7, conventionally, a feed terminal 77b has been arranged so as to extend upwardly (thickness direction) from the portion arranged in the lower face side of a circuit substrate 70B, which is a part of an antenna base 64B, and has been arranged to be connected to the circuit substrate 70B. According to the present embodiment, it is possible to reduce the thickness at a rate equivalent to the distance from the lower face of the antenna base 64B to the lower face of the circuit substrate 70B.

Furthermore, as in the present embodiment, the adverse effect to the antenna characteristics by noises coming from outside and radio frequency waves can be suppressed by feeding directly to the antenna element 66 from the circuit substrate 70 with the feed terminal 77 being inserted through the hole, not shown in drawing, formed in the vertical flat surface 65b of the wall portion 65 in the second case portion 64, compared to the case in which a predetermined conductive wire is pulled around.

Moreover, according to the present embodiment, since the first case portion 62 and the second case portion 64 are each separate members, they can be made of materials with properties suitable for each function.

Furthermore, according to the present embodiment, since the first case portion 62 and the second case portion 64 are manufactured by mutually independent processes, they can be suitably adapted to the design change of the first case portion 62 and the second case portion 64, respectively.

In addition, according to the present embodiment, by adhering the flexible wiring substrate 50 in which the antenna element 66 is formed to the case body 60 in which the first case portion 62 and the second case portion 64 are integrated, it is possible to built as a unit into the housing. In this way, the work load of building internal members into the housing can be reduced.

Additionally, according to the present embodiment, since the antenna element 66 is arranged in the end portion of the operation unit housing 21, as well as being arranged so as to have a positional relationship intersecting with the face including the broadest face of the circuit substrate 70, it is possible to prevent the antenna element 66 from being covered by hands, etc., while making a constitution in which electromagnetic waves coming from outside are easily received.

Here, in the above described present embodiment, as shown in FIG. 4B, although the antenna element 66 is connected to the conductive portion 75 arranged in the end face of the circuit substrate 70, as well as being fed from the feed terminal 77 inserted through the hole, not shown in drawing, formed in the wall portion 65 of the case body 60, the present invention is not limited thereto. A description is provided hereinafter regarding a modification example of the first embodiment while referencing to FIG. 8. It should be noted that, since the modification example in the first embodiment is similar to the above described first embodiment except for the flexible wiring substrate 50 and the feed structure, descriptions regarding similar portions thereof have been omitted.

Figure 8:
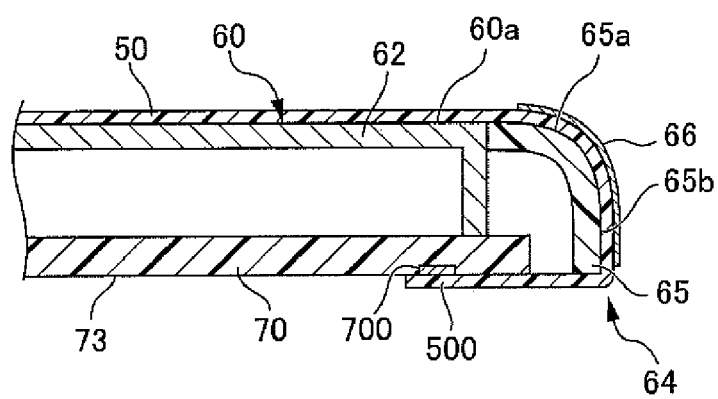
FIG. 8 is a partial cross sectional view illustrating a modification example in the structure of the case body 60 and the flexible wiring substrate 50 according to the first embodiment.

FIG. 8 is a partial cross sectional view describing a modification example in the structure of the case body 60 and the flexible wiring substrate 50 according to the first embodiment. As shown in FIG. 8, in a state in which the flexible wiring substrate 50 is mounted on the case body 60, the antenna element 66 is fed from the circuit substrate 70 thorough a feed terminal 700.

The feed terminal 700 is provided in a second face (rear face) 73 of the opposite side to the side where the case body 60 is arranged among the circuit substrate 70.

Then, a contact point 500, which feeds the antenna element 66 and is connected to the feed terminal 700, is provided in the one end side of the face in the case body 60 side of the flexible wiring substrate 50. This contact point 500 is electrically conductive to the antenna element 66.

The flexible wiring substrate 50 in the modification example is made to be longer than the flexible wiring substrate 50 in the first embodiment. Then, the flexible wiring substrate 50 is arranged to range from the curved surface 65a to the vertical flat surface 65b in the second case portion 64, while being arranged so that the portion extending out from case body 60 is folded back toward the face where the feed terminal 700 is provided in the circuit substrate 70 in the end face of the vertical flat surface 65b. In other words, the flexible wiring substrate 50 is arranged so that the portion which includes the contact point 500 in the flexible wiring substrate 50 is made to be folded back in the end portion of the vertical flat surface 65b, and is provided to extend in the second face 73 (rear face) to make the contact point 500 and the feed terminal 700 contact.

From such a configuration, the antenna element 66 is fed from the circuit substrate 70 through the feed terminal 700, as well as being connected to the radio frequency circuit such as an RF module of the circuit substrate 70.

According to the above modification example, in addition to the effects in the above described first embodiment, a feed structure can be configured with a simple structure in that provides a feed terminal 700 is provided in one face of the circuit substrate 70, along with the contact point 500 being provided in one face of the flexible wiring substrate 50. Consequently, the load in manufacturing can be reduced along with the manufacturing cost being controlled.

Although a preferred first embodiment of the present invention is described above, the present invention is not limited to the above described first embodiment, and can be implemented in various configurations. In the first embodiment, the first case portion 62 and the second case portion 64 are constituted by separate members; however, it may be formed as an integrated member. For example, while the first case portion 62 and the second case portion 64 are formed integrally with resin, one in which the portion constituting the first case portion 62 is covered with the conductive film may be used. Here, the conductive film can be formed by vapor deposition, plating, and spattering.

In this way, when the first case portion 62 and the second case 64 are formed to be an integrated member as this, the manufacturing process is simplified along with the load in the assembling work being able to be reduced.

Figure 5:
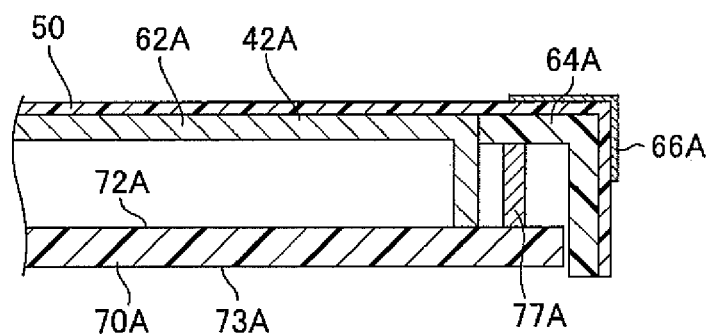
FIG. 5 is a partial side view illustrating another modification example in the structure of the case body 60 and the flexible wiring substrate 50 according to the first embodiment.

Moreover, in the first embodiment, although the wall portion 65 in the second case portion 64 is a shape having a curbed surface, it is not limited thereto, as shown in FIG. 5, and the upper face can be a shape that is flat. In this case, a feed terminal 77A can be arranged so as to extend upward (thickness direction) from a first face 72A in a circuit substrate 70A. Here, FIG. 5 is a partial side view illustrating another modification example in the structure of the case body 60 and the flexible wiring substrate 50 in the first embodiment.

Thus, by making the upper surface of the second case portion 64 to also be a shape that is a flat plane, the key switches 524a, 524b, and 524c in the flexible wiring substrate 50 mounted on the case body 60 and the key tops 424a, 424b, and 424c corresponding to these can be arranged in a range from the first case portion 62 to the second case portion 64. In this way, each interval of the key switches 524a, 524b, and 524c and each interval of the key tops 424a, 424b, and 424c can be arranged broadly, while the cellular telephone device 1 can be miniaturized by shortening the length of the operation unit housing 21.

Moreover, the antenna element 66 can be configured by a part of the printed wiring formed in the flexible wiring substrate 50. From this, the antenna can be manufactured simply at low cost. In addition, it is possible to enhance the freedom of size, shape, and arrangement of the antenna element 66. Furthermore, since a metal mold for shape forming of the antenna element 66 is not necessary, the lead time can be made short.

Figure 6:
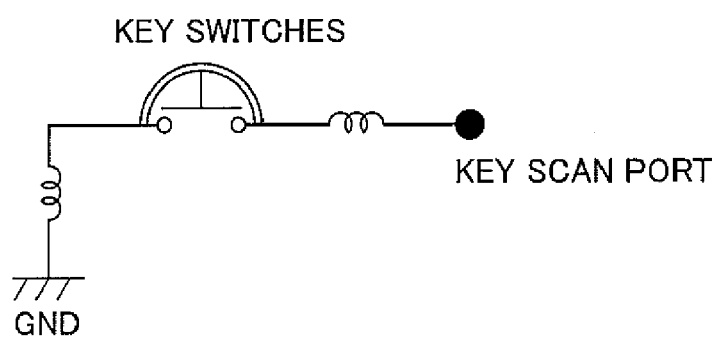
FIG. 6 is a drawing illustrating a modification example in the electrical circuit of a switch according to the first embodiment.

Moreover, as shown in FIG. 6, in the electric circuit of key switches 524a, 524b, and 524c in the flexible wiring substrate 50, a coil for eliminating radio frequency waves can be arranged. Here, FIG. 6 is a drawing describing a modification example in the electrical circuit of a switch according to the first embodiment. In this way, the adverse effect of radio frequency waves on antenna characteristics caused by the arrangement of the key switches 524a, 524b, and 524c in the flexible wiring substrate 50 close to the antenna element 66 can be suppressed.

According to the drawings from FIGS. 9 to 12, a description is provided regarding the cellular telephone device 1 in the second embodiment. Since the fundamental structure of the cellular telephone device 1 is similar to the cellular telephone device 1 in the first embodiment, descriptions regarding common contents are omitted. Hereinafter, a description is provided regarding the cellular telephone device 1, centering on points that are different from the first embodiment.

Figure 10A:
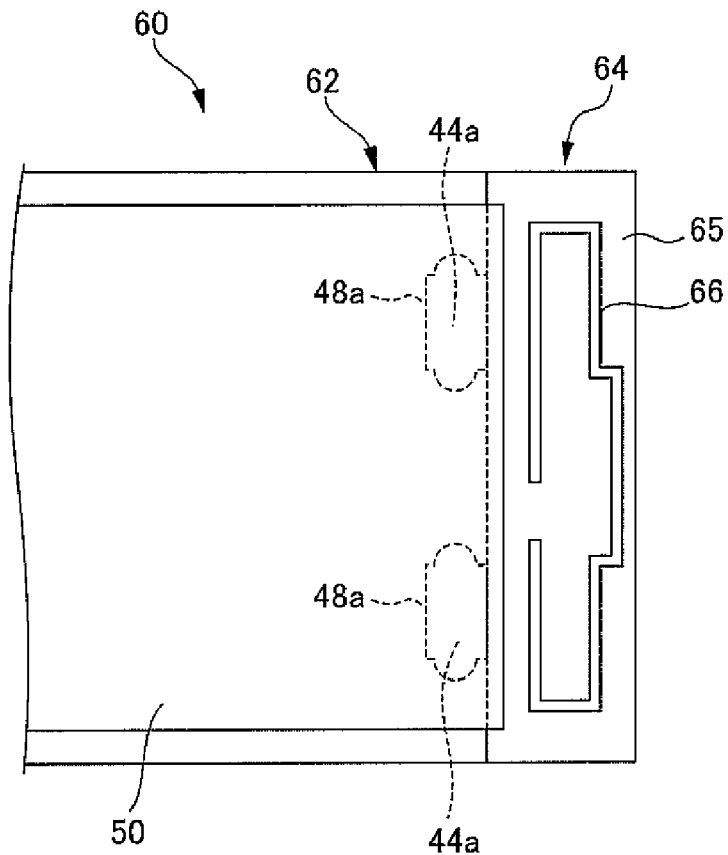
FIG. 10A is a partial plan view illustrating the structure of the case body 60 and the flexible wiring substrate 50 according to the second embodiment.
Figure 10B:
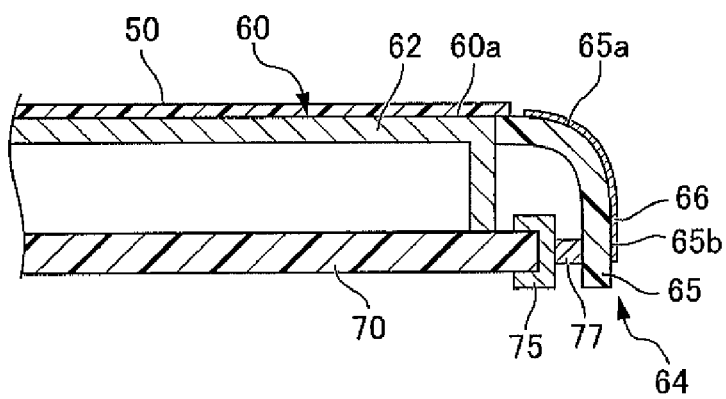
FIG. 10B is a partial cross sectional view illustrating the structure of the case body 60 and the flexible wiring substrate 50 according to the second embodiment.

FIG. 9 is an exploded side view of the operation unit housing 21 according to a second embodiment. FIG. 10A is a partial plan view illustrating the structure of the case body 60 and the flexible wiring substrate 50 in the second embodiment. FIG. 10B is a partial cross-sectional view describing the structure of the case body 60 and the flexible wiring substrate 50 in the second embodiment.

In the cellular telephone device 1 according to the present embodiment, the antenna element 66 is arranged in the case body 60. More specifically, as shown in FIG. 9, the antenna element 66 is arranged in a face of the opposite side to the circuit substrate 70 side in the second case portion 64 constituting the case body 60. The second case portion 64 functions as the antenna base. Since the second case portion 64 is arranged in the one end side of the cellular telephone device 1, the antenna 66 is arranged in the one end side of the cellular telephone device 1. More specifically, it is arranged in the end portion side opposite to the hinge mechanism 26 side.

The antenna element 66 is a belt-like metal film, and is arranged so as to be along the outer face in the second case portion 64 as the antenna base. More specifically, as shown in FIG. 10A, the belt-like metal film of the antenna element 66 goes around the outer periphery of the wall portion 65 so as to connect the mutually separated two points positioned at the first case portion 62 side in the wall portion 65 of the second case portion 64, as well as being arranged so as to have a protruded portion protruding outward in the side apart from the first case portion 62. Moreover, the antenna element 66 is arranged so as not to contact the first case portion 62, even in a state in which the first case portion 62 and the second case portion 64 are mutually engaged. Thereby, the antenna element 66 is electrically insulated from the first case portion 62.

The antenna element 66 is arranged to range from the curved surface 65*a* to the vertical flat surface 65*b* in the wall portion 65 of the second case 64. The curved surface 65*a* and the flat surface 65*b* in the wall portion 65 of the second case portion 64 is a face (a face which is not parallel) intersecting with the broad face in the case body 60 and the circuit substrate 70, and the antenna element 66 is arranged in the positional relationship so as to intersect with the broad face in the case body 60 and the circuit substrate 70. That is, the wall portion 65 (the curved surface 65*a* and the flat surface 65*b*) in which the antenna element 66 is formed is arranged so that a virtual plane including the wall portion 65 intersects with a virtual plane in parallel to the circuit substrate 70. In addition, in the present embodiment, the virtual plane including the wall portion 65 in which the antenna element 66 is arranged is referred to as a virtual plane including an arbitrarily specified positional region among the face of the wall portion 65 in which the antenna element 66 is arranged.

In a state in which the flexible wiring substrate 50 is mounted on the circuit substrate 70, as shown in FIGS. 10A and 10B, the antenna element 66 is fed by the circuit substrate 70 through the feed terminal 77. The feed terminal 77 is inserted through a hole, not shown in the drawing, formed in the vertical flat surface 65*b* of the wall portion 65 in the second case body 64, the one end of which is connected to the antenna element 66 arranged in the outer face of the second case portion 64. The other end of the feed terminal 77 is arranged in the end surface of the circuit substrate 70, along with being connected to a conductive portion 75 connected to the feed portion, not shown in the drawing. In this way, the antenna element 66 is fed from the circuit substrate 70 through the feed terminal 77, while being connected to a radio frequency circuit such as an RF module of the circuit substrate 70.

The flexible wiring substrate 50 has a plurality of key switches 524*a*, 524*b*, and 524*c* in the face of the front case 30 side, and is mounted on the flat plate portion 42 of the first case portion 62 and the wall portion 65 of the second case portion 64 in the case body 60. The flexible wiring substrate 50 extends out from the first case portion 62 in a state to be mounted on the case body 60 and, if not covering the antenna element 66, may be mounted over a part of the second case portion 64.

The key switches 524*a*, 524*b*, and 524*c* of the flexible substrate 50 is made to be a structure having a metal dome of a metal plate formed cubically to curve like a bowl. When the bowl-like shape top of the metal dome is depressed, it contacts the switch terminal formed in the electrical circuit, not shown in the drawing, printed in the surface of the flexible wiring substrate 50, and is electrically conductive.

According to the present embodiment, since the second case portion 64 as the antenna base in which the antenna element is disposed is integrally arranged to be layered in the circuit substrate 70, compared to a conventional structure in which the antenna base is arranged in parallel to the circuit substrate, the cellular telephone device 1 can be miniaturized and reduced in thickness. For example, by arranging other components in the occupying portion of the conventional antenna base, the cellular telephone device 1 can be miniaturized and reduced in thickness.

Moreover, as shown in FIG. 7, conventionally, a feed terminal 77*b* has been arranged so as to extend upward (thickness direction) from the portion arranged in the lower face of a circuit substrate 70B, which is a part of an antenna base 64B, and has been arranged to be connected to a circuit substrate 70B. According to the present embodiment, it is possible to reduce the thickness at a rate equivalent to the distance from the lower face of the antenna base 64B to the lower face of the circuit substrate 70B.

Moreover, according to the present embodiment, similarly to the first embodiment, since the first case portion 62 and the second case portion 64 are each separate members, they can be made of materials with properties suitable for each function.

In addition, according to the present embodiment, since the first case portion 62 and the second case portion 64 are manufactured by mutually independent processes, they can be suitably adapted to the design change of the first case portion 62 and the second case portion 64, respectively.

Furthermore, according to the present embodiment, by sticking the flexible wiring substrate 50 to the case body 60 in which the first case portion 62 and the second case portion 64 are integrated, it is possible to be built as a unit into the housing. In this way, the work load of building into the housing can be reduced.

Additionally, according to the present embodiment, since the antenna element 66 is arranged in the end portion of the operation unit housing 21, as well as being arranged so as to have a positional relationship intersecting with the face including the broadest face of the circuit substrate 70, it is possible to prevent the antenna element 66 from being covered by hands, etc., while making constitution in which electromagnetic waves coming from outside are easily received.

Here, in the above described embodiment, although in the upper face (inner side) of the rear case 80, sequentially from the rear case 80, the circuit substrate 70 of about the same size, the case body 60, the flexible wiring substrate 50, and the key sheet 40 are arranged to be layered to configure the cellular telephone device 1, the present invention is not limited thereto. A description is provided hereinafter regarding another embodiment while referring to FIG. 12. It should be noted that, since the other embodiment is similar to the above described embodiment except for the shape and the arrangement of the case body 60 and the circuit substrate 70, descriptions regarding similar portions thereof have been omitted.

Figure 12:
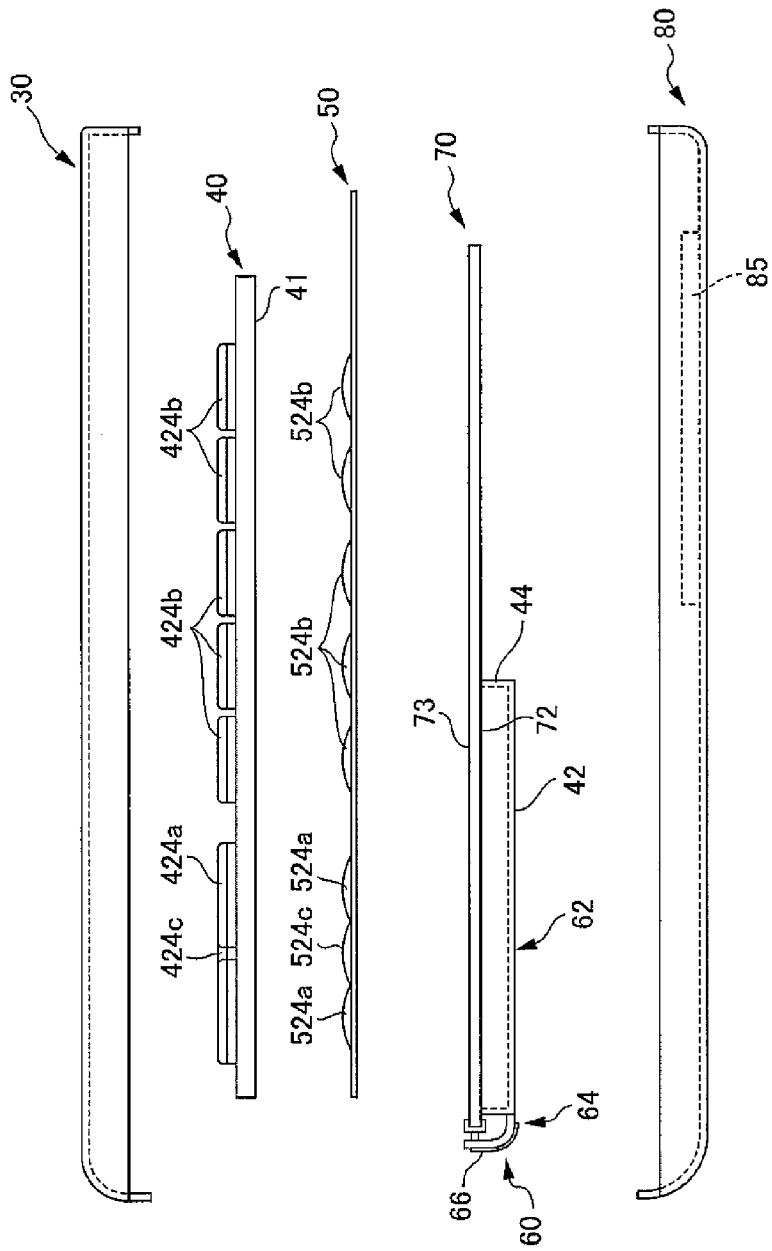
FIG. 12 is an exploded side view of the operation unit housing 21 according to a modified configuration of the second embodiment.

FIG. 12 is an exploded side view of the operation unit housing 21 in a modified configuration of the second embodiment. As shown in FIG. 12, the operation unit housing 21 includes the front case 30, the key sheet 40, the flexible wiring substrate 50, the circuit substrate 70 having the reference potential pattern and various electronic components, the case body 60, a rear case 80, and the battery 85. In the operation unit housing 21, the front case 30, the key sheet 40, the flexible wiring substrate 50, the circuit substrate 70, the case body 60, and the rear case 80 are arranged to be layered in this sequence. Here, the circuit substrate 70 is arranged so that the first face 72 in which the reference potential pattern and electronic components, not shown in the drawing, are arranged faces the rear case 80 side. In other words, the circuit substrate 70 is arranged so that the front/rear side is reversed to the above described embodiment.

In addition, the various electronic components, not shown in the drawing, are arranged in the one end side of the first face 72 collectively. Then, the case body 60 is arranged to be layered in the circuit substrate 70 so as to cover the various electronic components arranged collectively in the one end side of the first face 72. Here, since the first face 72 in the circuit substrate 70 is arranged so as to face the rear case 80 side, the case body 60 is arranged in the rear case 80 side in the circuit substrate 70. In other words, the case body 60 is arranged in the side opposite to the above described embodiment. For the above described embodiment, the sequence of the arrangement in the circuit substrate 70 and the case body 60 is reversed.

Since a size of the case body 60 large enough to cover the region in which the various electronic components in the circuit substrate 70 are collectively arranged is sufficient, the case body 60 is about half of the size of the case body 60 (see FIG. 9) in the above described embodiment. Then, the case body 60 arranged so as to cover the various electronic components, not shown in the drawing, collectively arranged in the one end side of the first face 72 is arranged to be biased in the one end side of the rear case 80 side in the circuit substrate 70.

The battery 85 is housed in an opening, not shown in the drawing, formed in the rear case 60 detachably from outside. The battery 85 is arranged to be biased in the other end side of the rear case 80. In detail, the battery 85 is arranged between the portion where the case body 60 in the face 72 of the circuit substrate 70 is not arranged and the outer face of the rear case 80. In other words, in a state in which the circuit substrate 70 on which the case body 60 is mounted is housed in the rear case 80, the case body 60 and the battery 85 are arranged in parallel without being superimposed.

Moreover, the flexible wiring substrate 50 is arranged to be layered on the second face 73 in the circuit substrate 70, and the key sheet 40 is arranged to be layered on the upper face of the flexible wiring substrate 50.

Furthermore, the case body 60 is arranged so that the second case portion 64 constituting the case body 60 is arranged in the one end side opposite to the end portion in which it is arranged in the above embodiment. In other words, the antenna element 66 arranged in the case portion 64 is arranged in the one end side opposite to the end portion in which it is arranged in the above embodiment.

Furthermore, since the case body 60 is arranged so as to be close to the inner face of the rear case 80, the antenna element 66 is arranged so as to be close to the inner face in the rear case 80. That is, the antenna element 66 is arranged in the one end side of the rear case 80 in a state in which there is nothing to shield other than the rear case 80.

According to the modified configuration of the second embodiment, adding to the effect in the above described second embodiment, an arrangement of electronic components in the circuit substrate 70 and the arrangement of the case body 60 is devised, by arranging each member to effectively utilize the space in the operation unit housing 21, thereby making it possible to further miniaturize and reduce the thickness of the cellular telephone device 1. It should be noted that, in FIG. 12, although an example in which the flexible wiring substrate 50 is arranged to be layered in the second face 73 of the circuit substrate 70 is shown, it may be that in which the key switches are directly formed in the second face 73 of the circuit substrate 70, in which case, the thickness of the operation unit housing 21 can be made thin.

Although a description has been provided above regarding the preferable second embodiment and the modified configuration, the present invention is not limited to the above described second embodiment and the modified configuration, and can be implemented in various kinds of configurations. In the second embodiment and the modified configuration, the first case portion 62 and the second case portion 64 are constituted by separate members; however, it may be formed as an integrated member. For example, while the first case portion 62 and the second case portion 64 are formed integrally with resin, one in which the portion constituting the first case portion 62 is covered with the conductive film may be used. Here, the conductive film can be formed by vapor deposition, plating, and spattering.

In this way, when the first case portion 62 and the second case 64 are formed to be an integrated member, the manufacturing process is simplified, along with the work load in the assembling being able to be reduced.

In addition, in the second embodiment and the modified configuration, an example in which the antenna element 66 is formed in the face in the opposite side to the circuit substrate 70 side among the wall portion 65 of the second case portion 64 is shown; however, it may be formed in the face of the circuit substrate 70 side among the wall portion 65 of the second case portion 64. Moreover, in the second embodiment and the modified configuration, the belt-like thin film constituting the antenna element 66 can be formed, for example, by vapor deposition, plating, and spattering. Here, as described above, in a case where the first case portion 62 and the second case portion 64 are integrally formed with resin and the first case portion 62 is coated with the conductive film, the antenna element 66 can be formed simultaneously with the conductive film of the first case portion 62. In addition, the antenna element 66 may be made by sheet-metal working, in which case, the antenna element 66 of sheet metal may be partially molded with resin to integrate the second case portion 64.

Figure 11:
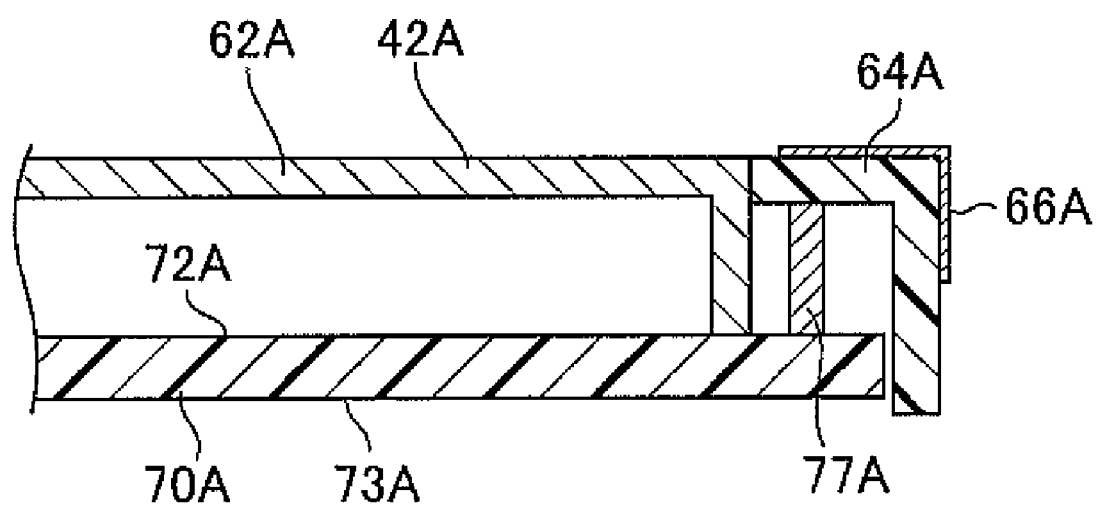
FIG. 11 is a side view illustrating a modification example in the structure of the case body 60 and the flexible wiring substrate 50 according to the second embodiment.

Furthermore, in the second embodiment and the modified configuration, the wall portion 65 in the second case portion 64 has the shape of a curved surface; however, it is not limited thereto and, as shown in FIG. 11, the upper face can also be made to be a flat shape. In this case, a feed terminal 77A can be arranged so as to extend upward (thickness direction) from a first face 72A in a circuit substrate 70A. Here, FIG. 11 is a side view illustrating a modification example in the structure of the case body 60 and the flexible wiring substrate 50 in the second embodiment.

Thus, by making the upper face of the second case portion 64 to also be a shape that is a flat plane, key switches 524a, 524b, and 524c in the flexible wiring substrate 50 mounted on the case body 60, and the key tops 424a, 424b, and 424c in the key sheet 40 corresponding to these can be arranged in a range from the first case portion 62 to the second case portion 64. In this way, each interval of the key switches 524a, 524b, and 524c and each interval of the key tops 424a, 424b, and 424c can be arranged broadly.

The invention claimed is:

1. A portable wireless device, comprising:
   a circuit substrate that includes a reference potential pattern and electronic components in a first face;
   a case body that includes a first case portion, which is arranged so as to cover the electronic components and is electrically conductive to the reference potential pattern, and a nonconductive second case portion that is arranged to be continuous to the first case portion and is arranged in an outer periphery of the circuit substrate; and
   a housing that houses the circuit substrate and the case body, wherein
   an antenna element is disposed in the second case portion or a predetermined member that is arranged to be layered in the second case portion,
   a feed point capable of supplying electric power to the antenna element is disposed in a rear face of an opposite side to a face in which the electronic components are arranged on the circuit substrate,
   a connection portion, which can be connected to the feed point and electrically conductive to the antenna element, is arranged in the one end side of the face the case body side of the wiring substrate, and
   a portion that includes the connection portion in the wiring substrate is provided to be extended in the rear side of the circuit substrate so as to be folded back, and the connection portion and the feed point are connected.

2. A portable wireless device, comprising:
   a circuit substrate that includes a reference potential pattern and electronic components in a first face;
   a case body that includes a first case portion, which is arranged so as to cover the electronic components and is electrically conductive to the reference potential pattern, and a nonconductive second case portion that is arranged to be continuous to the first case portion and is arranged in an outer periphery of the circuit substrate;
   a wiring substrate that is arranged to be layered in a side opposite to the circuit substrate side in the case body from the first case portion to the second case portion; and
   a housing that houses the circuit substrate, the case body, and the wiring substrate,
   wherein an antenna element is disposed in a portion arranged to be layered in the second case portion in the wiring substrate,
   wherein a feed point capable of supplying electric power to the antenna element is disposed in a rear face of an opposite side to a face in which the electronic components are arranged on the circuit substrate,
   wherein a connection portion, which can be connected to the feed point and electrically conductive to the antenna element, is arranged in the one end side of the face the case body side of the wiring substrate, and
   wherein a portion that includes the connection portion in the wiring substrate is provided to be extended in the rear side of the circuit substrate so as to be folded back, and the connection portion and the feed point are connected.

3. A portable wireless device according to claim 2, wherein a wall portion in which an antenna element of a wiring substrate in the second case portion is arranged to be layered, is disposed so that a virtual plane including the wall portion is arranged so as to intersect with a virtual plane in parallel to the circuit substrate.

4. A portable wireless device according to claim 2, wherein a plurality of key switches is included in a portion that is arranged to be layered in at least the first case portion of the wiring substrate, and a key sheet is provided between the housing and the key switches.

5. A portable wireless device according to claim 4, wherein the plurality of key switches is arranged from the first case portion to the second case portion.

6. A portable wireless device according to claim 2, wherein the first case portion and the second case portion are configured to be separate members and are integrated to be mutually engaged.

7. A portable wireless device according to claim 2,
   wherein the case body includes the first case portion and the second case portion, which are integrally molded with resin, and
   wherein a portion configuring the first case portion is covered with a conductive film.

8. A portable wireless device, comprising:
   a circuit substrate that includes a reference potential pattern and electronic components in a first face;
   a case body that includes a first case portion, which is arranged so as to cover the electronic components and is electrically conductive to the reference potential pattern, and a nonconductive second case portion, which is arranged to be continuous to the first case portion and is arranged in an outer periphery of the circuit substrate; and
   a housing that houses the circuit substrate and the case body, wherein
   the second case portion is provided with a wall portion in which an antenna element is disposed, the wall portion is arranged so that a virtual plane including the wall portion is arranged so as to intersect with a virtual plane in parallel to the circuit substrate,
   a feed point capable of supplying electric power to the antenna element is disposed in a rear face of an opposite side to a face in which the electronic components are arranged on the circuit substrate,
   a connection portion, which can be connected to the feed point and electrically conductive to the antenna element, is arranged in the one end side of the face the case body side of the wiring, substrate, and
   a portion that includes the connection portion in the wiring substrate is provided to be extended in the rear side of the circuit substrate so as to be folded back, and the connection portion and the feed point are connected.

9. A portable wireless device according to claim 8, further comprising a key board that includes key switches,
   wherein the key board is arranged to be layered in an opposite side to the circuit substrate side at least in the first case portion of the case body.

10. A portable wireless device according to claim 8,
    wherein key switches are provided in a second face side, which is an opposite side to the first face of the circuit substrate,
    wherein the case body is disposed so as to cover a portion of the first face, and
    wherein a battery is arranged between a portion where the case body in the first face is not arranged and an outer lateral side in the housing.

11. A portable wireless device according to claim 8, wherein the first case portion and the second case portion are configured as separate members, and are mutually engaged to be integrated.

12. A portable wireless device according to claim 8,
    wherein the case body includes the first case body and the second case body, which are integrally molded with resin, and
    wherein a portion configuring the first case portion is covered with a conductive film.

* * * * *